(12) United States Patent
Giffen

(10) Patent No.: US 11,308,022 B2
(45) Date of Patent: Apr. 19, 2022

(54) SUPPORT FOR COMMON MOTHERBOARD CONFIGURATION FOR USB RETIMING

(71) Applicant: Dell Products, L.P., Round Rock, TX (US)

(72) Inventor: Jonathan C. Giffen, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/884,823

(22) Filed: May 27, 2020

(65) Prior Publication Data

US 2021/0374088 A1 Dec. 2, 2021

(51) Int. Cl.
*G06F 13/42* (2006.01)
*G06F 13/40* (2006.01)
*G06F 13/20* (2006.01)

(52) U.S. Cl.
CPC .......... *G06F 13/4282* (2013.01); *G06F 13/20* (2013.01); *G06F 13/4059* (2013.01); *G06F 2213/0042* (2013.01)

(58) Field of Classification Search
None
See application file for complete search history.

(56) References Cited

U.S. PATENT DOCUMENTS

| 2016/0174374 | A1* | 6/2016 | Kong | H01L 23/49822 174/262 |
| 2017/0017604 | A1* | 1/2017 | Chen | G06F 13/4221 |
| 2017/0351640 | A1* | 12/2017 | Nilange | G06F 13/4291 |
| 2018/0181502 | A1* | 6/2018 | Jen | G06F 13/4282 |
| 2018/0329855 | A1* | 11/2018 | Das Sharma | G06F 13/4295 |
| 2019/0131974 | A1* | 5/2019 | Das Sharma | G06F 3/017 |
| 2019/0149265 | A1* | 5/2019 | Das Sharma | H04L 1/0041 714/776 |
| 2019/0227922 | A1* | 7/2019 | Braun | G06F 13/4022 |

* cited by examiner

*Primary Examiner* — Henry Tsai
*Assistant Examiner* — Christopher A Bartels
(74) *Attorney, Agent, or Firm* — Fogarty LLP

(57) ABSTRACT

A motherboard may utilize a retimer device to condition signals used for high-speed USB data transfers. Motherboard embodiments include a common footprint for USB retiming capabilities. A motherboard that supports high-speed USB transfers, such as transfers of 10 Gbps or greater, utilizes a retimer in the footprint. A motherboard that supports lower-speed USB transfers, such as 5 Gbps, utilizes a passive bridge component in the footprint, where the bridge may be formed from a dielectric substrate. During manufacture of an IHS (Information Handling System) a common motherboard is selected that includes a retimer footprint, where the motherboard includes traces that couple the footprint to a USB connector and traces that couple the footprint to a USB controller. Based on the USB transfer speeds to be supported by the motherboard, a USB retimer or a passive bridge is installed in the retimer footprint.

17 Claims, 3 Drawing Sheets

SUPPORT FOR COMMON MOTHERBOARD CONFIGURATION FOR USB RETIMING

FIELD

This disclosure relates generally to Information Handling Systems (IHSs), and more specifically, to motherboard configurations utilized by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs typically include a printed circuit board (PCB), commonly known as a motherboard, that provides electrical connections that support communications between components of the IHS that are mounted or otherwise coupled to the motherboard. Some IHS components are attached directly to the motherboard, such as a microcontroller that is soldered to pads or vias provided by the motherboard. Other IHS components may be attached indirectly to the motherboard via a provided connector, such as a memory module that is inserted within a memory slot connector provided by the motherboard, or such as a processor attached to a socket provided by the motherboard. Some connectors provided by a motherboard may be externally accessible and may thus serve as ports that allow a user to connect external devices and networks to an IHS. For instance, a motherboard may support USB (Universal Serial Bus) connectors that allow a user to connect USB-compatible devices to an IHS.

SUMMARY

Various embodiments provide methods for manufacturing an Information Handling System (IHS). The methods include: selecting a motherboard for the IHS, wherein the motherboard comprises a USB retimer footprint, wherein the motherboard comprises traces that couple the retimer footprint to a USB connector of the motherboard, and wherein the motherboard further comprises traces that couple the retimer footprint to a USB controller coupled to the motherboard; determining a USB speed to be supported by the motherboard; when the motherboard is determined to support a first USB speed, installing a USB retimer in the retimer footprint; and when the motherboard is determined to support a second USB speed slower than the first USB speed, installing a passive bridge in the retimer footprint. In additional method embodiments, the first USB speed is 10 Gbps and the second USB speed is 5 Gbps. In additional method embodiments, the USB controller is a system-on-chip function of a processor of the IHS. In additional method embodiments, the retimer footprint is located on the motherboard to support USB communications at or above the first USB speed. In additional method embodiments, the location of the retimer footprint on the motherboard supports use of a single USB retimer for signals transmitted via the retimer footprint. In additional method embodiments, the passive bridge does not utilize a clock signal. In additional method embodiments, the passive bridge is comprised of a dielectric substrate. In additional method embodiments, the motherboard is configured during manufacture for supporting the determined USB speed based on installation of the USB retimer or the passive bridge in the retimer footprint. In additional method embodiments, the motherboard traces couple the retimer footprint to multiple USB connectors of the motherboard.

In various additional embodiments, Information Handling Systems (IHSs) include: a plurality of USB connectors coupled to a motherboard; a USB controller coupled to the motherboard; and the motherboard comprising a plurality of USB retimer footprints, and further comprising traces that couple a first retimer footprint to a first USB connector of the plurality of USB connectors, and further comprising traces that couple the first retimer footprint to the USB controller, wherein a USB retimer is installed in the first retimer footprint when the motherboard supports a first USB speed, and wherein a passive bridge is installed in the first retimer footprint when the motherboard supports a second USB speed slower than the first USB speed.

In additional IHS embodiments, the first USB speed is 10 Gbps and the second USB speed is 5 Gbps. In additional IHS embodiments, the USB controller is a system-on-chip function of a processor of the IHS. In additional IHS embodiments, the first retimer footprint is located on the motherboard to support USB communications at or above the first USB speed. In additional IHS embodiments, the location of the first retimer footprint on the motherboard supports use of a single USB retimer for signals transmitted via the first retimer footprint. In additional IHS embodiments, the passive bridge is comprised of a dielectric substrate and bonding conductors.

In various additional embodiments, motherboards are provided for use by an Information Handling System (IHS). The motherboards include: a plurality of USB connectors; a USB controller; traces that couple a USB retimer footprint to a first USB connector of the plurality of USB connectors; traces that couple the USB retimer footprint to the USB controller; and a USB retimer footprint, wherein a USB retimer is installed in the retimer footprint when the motherboard supports a first USB speed, and wherein a passive bridge is installed in the retimer footprint when the motherboard supports a second USB speed slower than the first USB speed.

In additional motherboard embodiments, the first USB speed is 10 Gbps and the second USB speed is 5 Gbps. In additional motherboard embodiments, the retimer footprint is located on the motherboard to support USB communications at or above the first USB speed. In additional motherboard embodiments, the location of the retimer footprint on the motherboard supports use of a single USB retimer for signals transmitted via the retimer footprint. In additional motherboard embodiments, the passive bridge is comprised of a dielectric substrate and does not utilize a clock signal.

BRIEF DESCRIPTION OF THE DRAWINGS

The present invention(s) is/are illustrated by way of example and is/are not limited by the accompanying figures.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
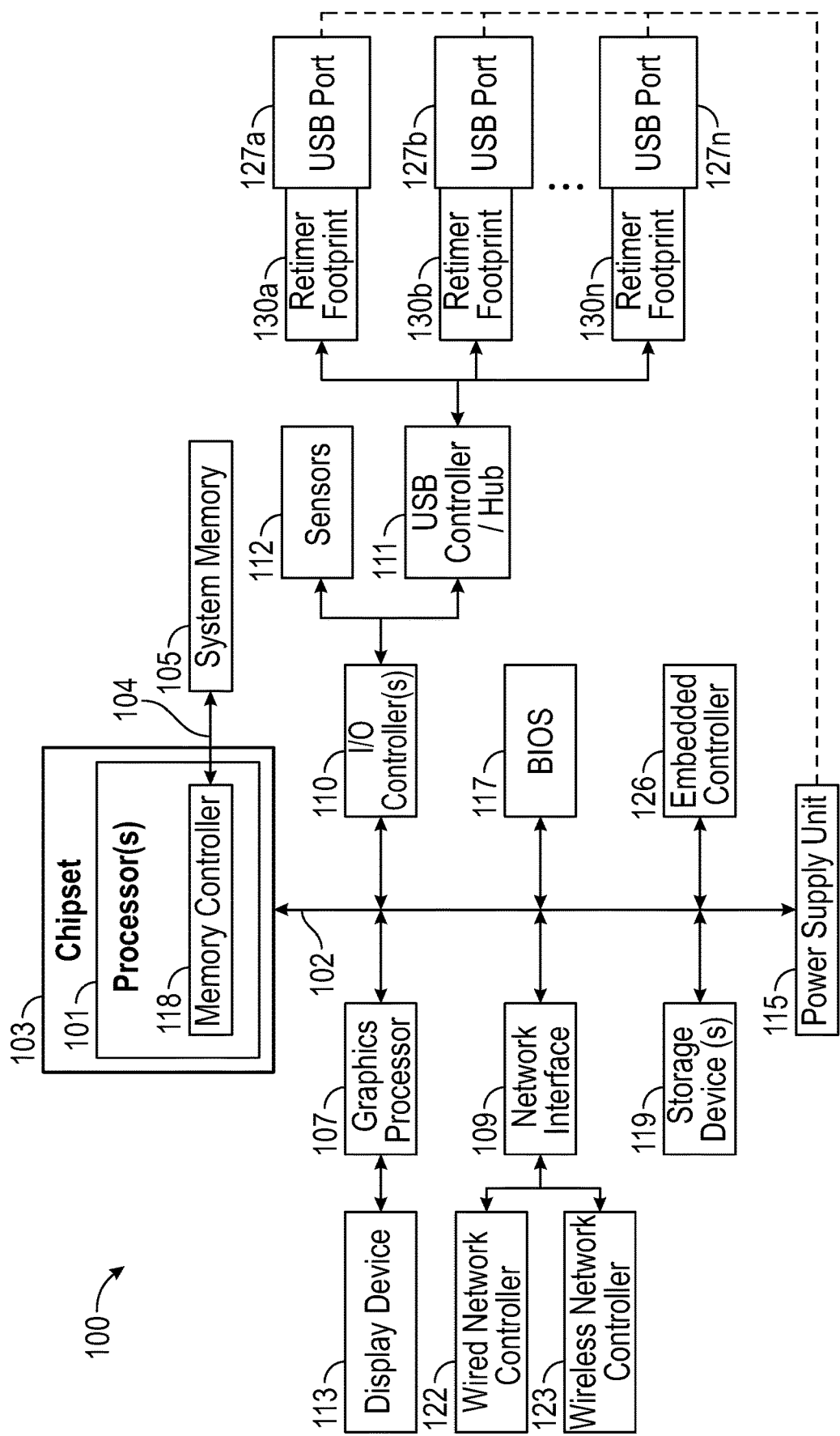
FIG. 1 is a block diagram depicting certain components of an IHS according to various embodiments that may be configured for supporting different USB speeds using a common motherboard configuration for USB retiming.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, such as a desktop computer, other embodiments may be utilized.

The Universal Serial Bus (USB) protocol enables an IHS to communicate data and transfer power with external devices that are compatible with USB standards. In USB data communications, data may be transmitted between two USB ports via a USB cable, such as a cable coupled to a USB port of the IHS and to a USB port of an external device. As the length of such USB cables increases, the data signals transmitted between the USB ports tend to deteriorate during transmission. In addition, the use of separate clocks by the IHS and the external device on the other end of the USB cable results in accumulated jitter in the USB data communications. A retimer device may be utilized on one or both ends of the USB cable to "retime" USB signals in order to mitigate deterioration of the signals during transmission from one port to another. In order to recondition received USB signals, retimer devices utilized by IHSs typically utilize a clock recovery circuit or other technique to synchronize the received signals with a clock signal of the IHS. As USB transfer speeds increase, the need for retiming of these USB signals also increases since signals transmitted at these faster speeds tend to exhibit greater deterioration.

FIG. 1 is a block diagram depicting certain components of an IHS 100, such as a desktop computer, operable according to various embodiments for supporting different USB speeds using a common motherboard configuration for USB retiming. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 113 coupled to the IHS 100. The one or more display devices 113 coupled to IHS 100 may utilize LCD, LED, OLED, or other display technologies. Each display device 113 may be capable of receiving touch inputs such as via a touch controller that may be an embedded component of the display device 113 or graphics processor 107, or may be a separate component of IHS 100 accessed via bus 102. In embodiments where IHS 100 is a laptop, tablet, 2-in-1 convertible device, or mobile device, display device 113 may be an integrated display device. In some embodiments, IHS 100 may be a hybrid laptop computer that includes dual integrated displays incorporated in both of the laptop panels.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. In embodiments where IHS 100 is a mobile computing device, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of processor 101. USB controller 111 supports communications between IHS 100 and one or more USB devices coupled to IHS 100. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0, USB 3.1, USB 3.2). In providing functions of a hub, USB controller 111 may support concurrent couplings by multiple USB devices via the USB ports 127a-n supported by IHS 100.

USB controller 111 may support data communications with USB devices that are coupled to USB ports 127a-n, such as via USB cables that couple a USB device to one of the USB ports 172a-n. As described, USB data signals may degrade when transmitted over a USB cable, with the degradation increasing when signals are transmitted over longer USB cables. In addition, jitter tends to accumulate in transmitted USB signals due to the use of separate clocks by the IHS 100 and the USB devices coupled to USB ports 127a-n. These USB signaling issues become increasingly problematic at higher USB transfer speeds. Accordingly, each of the USB ports 127a-n may utilize a USB retimer that is installed, according to embodiments, in a retimer footprint 130a-n that is provided by the motherboard of IHS 100. In some embodiments, a USB retimer may be capable of supporting multiple USB ports 127a-n such that the motherboard of IHS 100 includes a single retimer footprint that may accommodate a USB retimer or a passive bridge component. As described in additional detail below, a retimer footprint 130a-n provides a common motherboard location for USB retiming capabilities, regardless of whether the IHS 100 will utilize a retimer or a passive bridge component in this footprint. A USB retimer installed in a retimer footprint 130a-n may synchronize and/or recondition the USB data signals received via one of the USB ports 127a-n. Such USB retiming is typically required to support higher speed USB transmissions, in particular for data transmissions at or above 10 Gbps. For some motherboards, however, such USB retiming may not be required to support lower USB transmissions, such as for data transmissions at or below 5 Gbps. In such instances, a passive bridge component may be installed in the retimer footprints 130a-n rather than installing a more costly retimer.

The USB power transmissions supported by IHS 100 may include incoming charging inputs received via USB ports 127a-n, as well as outgoing power outputs that are transmitted from IHS 100 to USB devices that are coupled to USB ports 127a-n. Power inputs received via USB ports 127a-n may be routed to a power supply unit 115 of IHS 100. USB controller 111 may negotiate with coupled USB devices to configure power inputs from a USB device received via USB ports 127a-n and/or power outputs from the IHS to a USB device coupled via a USB port 127a-n.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100. Embedded controller 126 may also implement operations for interfacing with a power supply unit 115 in managing power for IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
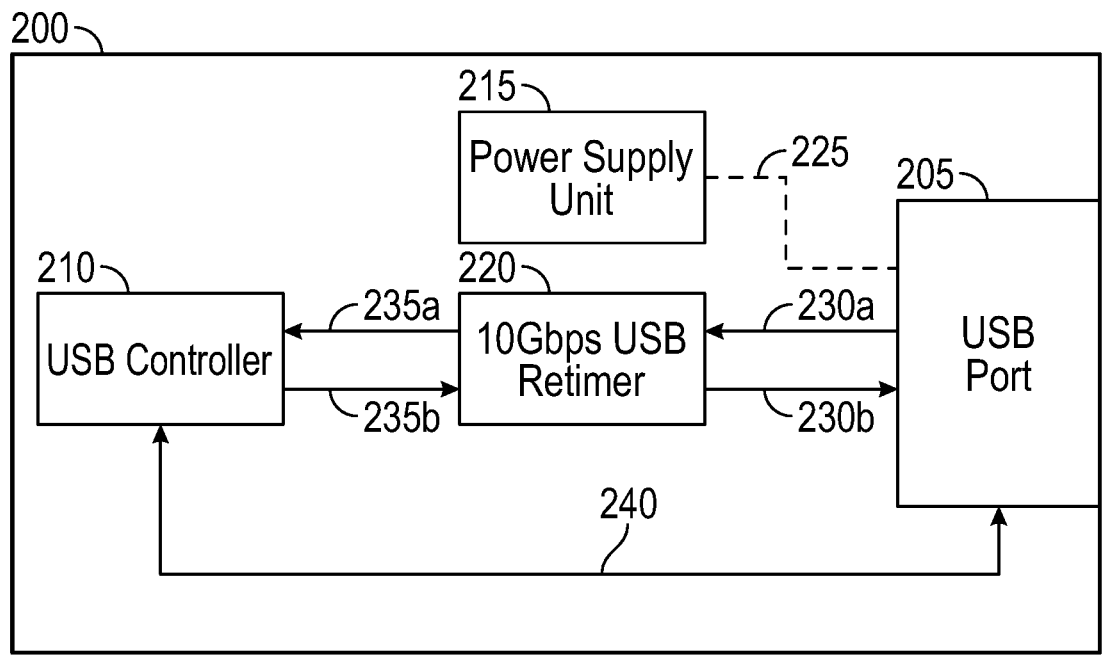
FIG. 2A is a block diagram depicting components of a motherboard that is configured according to embodiments for supporting 10 Gb USB speeds using a USB retimer installed in a motherboard USB retimer footprint.

FIG. 2A is a block diagram depicting components of a motherboard that is configured according to embodiments for supporting 10 Gbps USB speeds using a USB retimer installed in a retimer footprint of the motherboard. As described, when receiving high-speed USB signals, motherboards may utilize a USB retimer to compensate for degradation in the integrity of the transmitted signals. In the embodiment of FIG. 2A, a motherboard 200 includes a USB port 205 that receives a corresponding connector of a USB cable, thus coupling an external USB device to the motherboard 200. Via such coupling of external USB devices to USB port 205, data and power may be transferred between the motherboard 200 and the external USB device. As illustrated, power transmissions via the USB port 205 may be routed via a power circuit 225 of the motherboard 200 to a power supply unit 215 of the IHS in which motherboard 200 is installed. In various embodiments, all or some of the components of the power supply unit 215 may be components that are not mounted on motherboard 200. By transferring power in either direction on power circuit 225, power supply unit 215 may receive an input current from an external USB device coupled to USB port 205 or may provide an output current to a coupled external USB device. As illustrated, motherboard 200 also includes legacy USB signaling pathway 240 that supports USB data transfers using older versions of the USB standard, such as USB 2.0, that operate at lower speeds that do not require retiming and that transmit data using a bidirectional signaling pathway rather than the differential pair data signals utilized by more recent versions of the USB standard, such as USB 3.x.

As illustrated in FIG. 2A, motherboard 200 includes signal pathways 230a-b that connect the USB port 205 to the 10 Gbps USB retimer 220. As described, embodiments utilize a common motherboard 200 for use in supporting different USB speeds through use of a common USB retimer footprint on these motherboard embodiments. According to USB signaling protocols, signal pathway 230a provides a differential pair of motherboard traces for transmitting data from USB port 205 to the 10 Gbps USB retimer 220 installed in the retimer footprint of the motherboard. Similarly, signal pathway 230b provides a differential pair of motherboard traces for transmitting data from the 10 Gbps USB retimer 220 to the USB port 205. As illustrated, motherboard 200 similarly includes a signaling pathway 235a for transmitting data from the retimer footprint to a USB controller 210 installed on the motherboard and also includes a signaling pathway 235b for transmitting data in the other direction, from the USB controller 210 to the retimer footprint, where the 10 Gbps USB retimer 220 is installed. In some embodiments, signaling pathways 235a-b may instead couple the retimer footprint of motherboard 200 to the chipset of a processor mounted on motherboard 200, such as in embodiments where USB logic is implemented by system-on-chip functions of a main processor.

As described, USB retimers are employed in order to compensate for degradation in received USB data signals. Such signal degradation is more prevalent in high-speed USB transmissions. For instance, for certain motherboards, 10 Gbps USB communications cannot be supported reliably without use of a retimer to recondition the USB signals received from an external device, but 5 Gbps USB transmissions may be supported without the need for a retimer. In addition to distortion in USB signals during transmission from external USB devices, when operating using high transmission speeds, such as 10 Gbps, distortion can also result while the signal is being routed via the traces of the motherboard 200. As a result, designers of a motherboard 200 may prefer to physically place 10 Gbps USB retimer 220 in a location on the motherboard that allows the reconditioned output signal of retimer 220 to be further transmitted by motherboard 200 and processed without further retiming. Accordingly, 10 Gbps USB retimer 220 is preferably placed strategically on motherboard 200 in a location that minimizes the number of additional retimers that are required by motherboard 200 to support high-speed USB data transmission rates.

In existing motherboards, if 10 Gbps USB data transfers are not being supported, such that no USB retimer is required, the strategic motherboard location that would be used by a 10 Gbps USB retimer is instead utilized for another purpose. As a result, different motherboard designs are presently utilized in IHSs supporting high-speed 10 Gbps USB data transfers versus IHSs that instead support lower-speed 5 Gbps USB data transfers. In addition to the need for a retimer, supporting high-speed 10 Gbps USB communications may require significant additional modifications that are not necessary for supporting lower-speed USB data transfers, such as 5 Gbps transmissions. Accordingly, supporting high-speed 10 Gbps communications results in greater costs in manufacturing a motherboard compared to costs for supporting lower-speed 5 Gbps communications. In scenarios where an IHS manufacturer offers multiple types of IHS, it is preferable to utilize common motherboard designs in these different types of IHSs. In other words, it is preferable for a single motherboard design to be utilized within has many different types of IHSs as possible. However, where multiple different types of IHSs are offered, some types of IHSs may be offered at lower costs and with more basic performance capabilities. With regard to USB speeds, such lower cost types of IHSs may support 5 Gbps data transfer speed and forgo the extra costs required to support 10 Gbps transfer speeds.

Figure 2B:
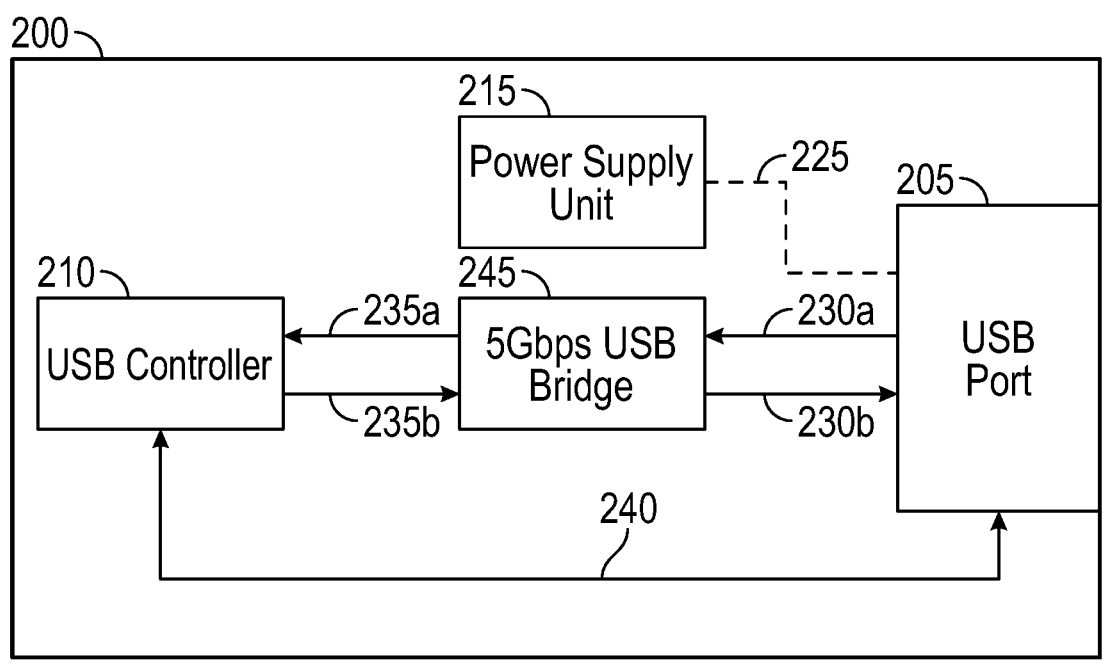
FIG. 2B is a diagram depicting components of the motherboard of FIG. 2A that may be configured according to embodiment for supporting 5 Gb USB speeds using a passive bridge installed in the motherboard USB retimer footprint.

FIG. 2B is a diagram depicting the motherboard of FIG. 2A that is configured according to embodiment for supporting 5 Gbps USB speeds using the same USB retimer footprint as in FIG. 2A. However, in the embodiment of FIG. 2B, a 5 Gbps USB bridge 245 has instead been installed in the USB retimer footprint of motherboard 200. Other than the use of the 5 Gbps USB bridge 245, the remaining elements of motherboard 200 that are illustrated in FIG. 2B may be identical to their counterparts in FIG. 2A. As such, the same motherboard 200 layout may be utilized in supporting both high-speed and low-speed USB data transfer in different types of IHSs.

In various embodiments, the 5 Gbps USB bridge 245 may be a component that fits identically as the 10 Gbps USB retimer 220 within the retimer footprint of motherboard 200, but the 5 Gbps USB bridge 245 is a passive component that efficiently relays received data transmissions. The bridge 245 includes leads that correspond to the vias and/or pads of the retimer footprint and are used to couple the bridge to the vias and/or pads of the motherboard. As a passive component, the 5 Gbps USB bridge 245 does not include any retiming capabilities and does not utilize a clock signal or other such circuitry. In some embodiments, the 5 Gbps USB bridge 245 may be constructed using a dielectric substrate that promotes efficient transmission of signals without contributing to distortion of the transmitted signals. Through use of signal pathways embedded in a dielectric substrate, the 5 Gbps USB bridge 245 provides insulated signal transmissions with minimal distortion. The inventor has demonstrated that reliable 5 Gbps USB communications may be supported by utilizing such a passive bridge that is installed in a retimer footprint. In some embodiments, the 5 Gbps USB bridge 245 also includes bonding conductors that couple the bridge 245 to a grounded circuit on the IHS motherboard, thus providing improved signal integrity through differential impedance matching with reference to the dielectric substrate serving to stabilize the behavior of the bridge.

Figure 3:
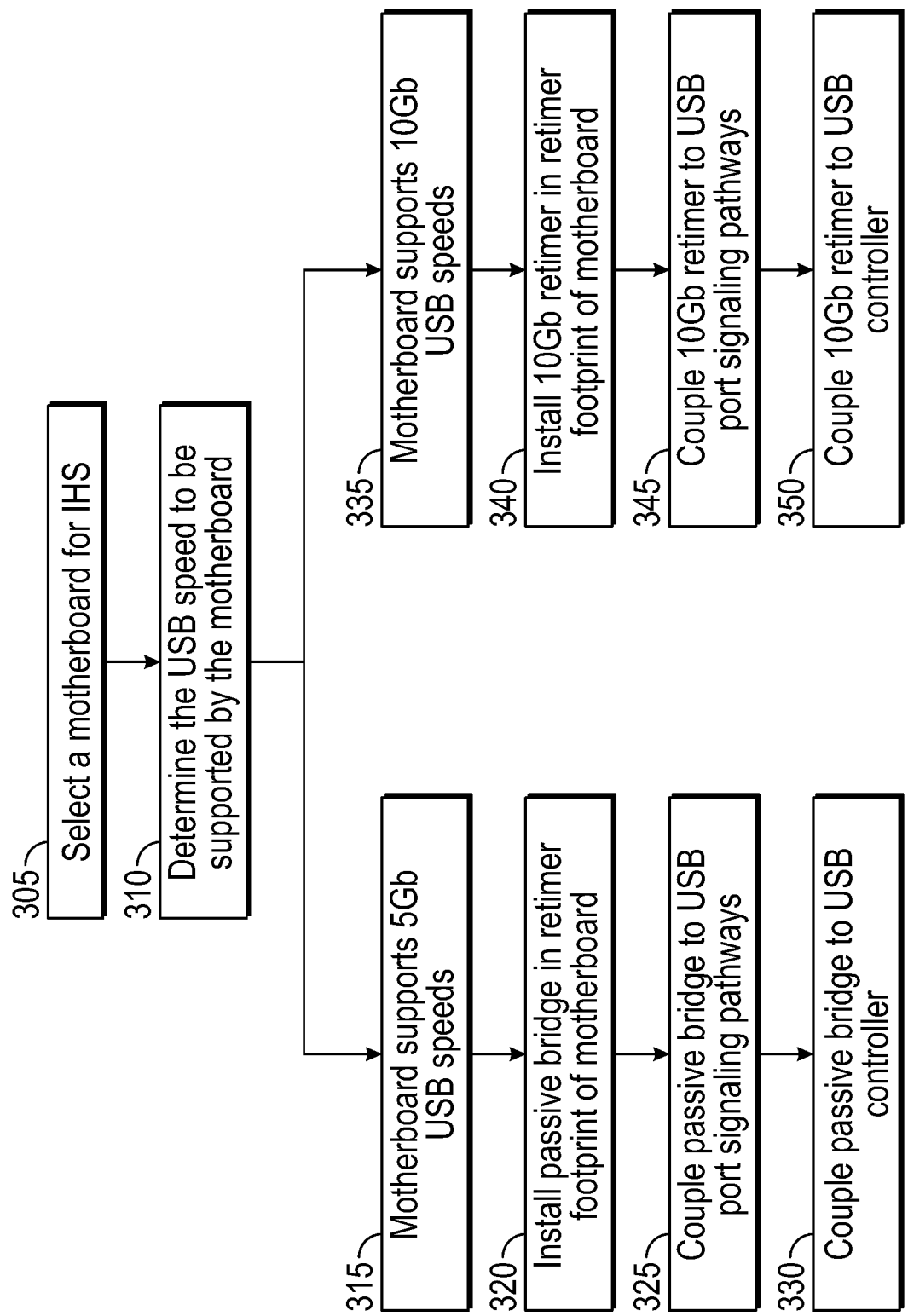
FIG. 3 is a flow chart diagram illustrating certain steps of a manufacturing process according for assembly of IHSs using a common motherboard configured for supporting different USB speeds through installation of a retimer or a passive bridge to a USB retimer footprint of the motherboard.

FIG. 3 is a flow chart diagram illustrating certain steps of a manufacturing process according to embodiments for assembly of IHSs using a common motherboard configured for supporting different USB speeds through installation of a retimer or a passive bridge to a USB retimer footprint of the motherboard. As described, a manufacturer of IHSs may offer various types of IHSs. For instance, a manufacturer of desktop computers may offer various models of desktops, where the different models are commonly outfitted with various combinations of hardware upgrades from the hardware of a base model. In supporting the manufacturer of such various types of IHSs, it is preferable to utilize as few different types of motherboard designs as possible in these IHSs. Each unique motherboard design supported by a manufacturer of IHSs must be separately validated, manufactured and tested. However, at the same time, efforts to provide improved performance and reliability tend to result in motherboards that are specialized to particular applications.

As described, motherboards may support high-speed 10 Gbps USB data transfers or may instead reduce costs and support lower-speed 5 Gbps USB data transfers. Also as described, the high speeds of 10 Gbps signaling contribute to deteriorated signal integrity, such that a USB retimer is utilized to recondition a high-speed USB signal that is received from an external USB device. In order to support high-speed USB signaling at speeds of 10 Gbps and greater, some existing motherboard designs locate a USB retimer at a strategic motherboard position that seeks to shield these high-speed USB signals from interference and also seeks to avoid the need for an additional retimer within that same USB data circuit. Without such strategic positioning of a USB retimer on a motherboard, transmitting USB data at 10 Gbps speeds via the traces of the motherboard may result in sufficient deterioration of the signals that requires the use of an additional USB retimer at another motherboard location. Accordingly, existing motherboard designs tend to locate USB retimers in a manner where the retimer is strategically located near certain components and also strategically distanced from other components. As a result, support for high-speed USB signaling tends to serve as a motivating factor for supporting a specialized motherboard design.

However, use of a common motherboard that supports both high-speed and lower-speed USB data transfers is preferred. A significant issue in using a motherboard that supports high-speed USB data transfers for IHSs that only provide lower-speed USB transfers is the unnecessary expense of the USB retimer, which may not be necessary for lower speed transmissions. Accordingly, embodiments utilize a common motherboard design that can support both high-speed and lower-speed USB data transfers, where the described passive bridge component is installed in the same footprint used as the USB retimer when a motherboard has been designated for use supporting lower speed USB data transfers. FIG. 3 illustrates steps of manufacturing an IHS in a manner that utilizes a common motherboard that is configurable for supporting either high-speed or lower-speed USB transfers depending on whether a USB retimer or a passive bridge is installed in the USB retimer footprint of the motherboard.

The illustrated embodiment begins at step 305 with the selection of a common motherboard for assembly of an IHS, where the selected motherboard supports both high-speed and lower speed USB data transfers as described herein. At block 310, the USB transfer speed to be supported by the selected motherboard is determined. As described, a base model IHS may utilize a motherboard that supports lower-speed USB data transfers, while an upgraded model IHS may utilize a motherboard that supports higher-speed USB data transfers.

At block 335, it is determined that the motherboard to be installed in the IHS is to support high-speed, such as 10 Gbps, USB data transfers. At block 340, a USB retimer capable of supporting the high-speed transmissions is installed in the retimer footprint of the motherboard. The USB retimer is then coupled, at block 345 to the USB port by connecting leads of the retimer to traces provided by the motherboard that connect the retimer footprint to the USB port. Similarly, at block 350, the USB retimer is coupled to a USB controller by connecting additional leads of the retimer to traces provided by the motherboard that connect the retimer footprint to USB controller, which may be implemented by the chipset of the IHS in some embodiments.

At block 315, it is determined that the motherboard to be installed in the IHS is to support lower speed, such as 5 Gbps, USB data transfers. At block 320, a passive bridge is installed in the retimer footprint of the motherboard, where the passive bridge provides a low cost capability for supporting USB data transmissions at lower speeds without appreciable degradation of these data signals. As with the USB retimer, at block 325, leads of the passive bridge are coupled to the traces provided by the motherboard that connect the retimer footprint to the USB port and, at block 330, the passive bridge is connected to the traces provided by the motherboard that connect the retimer footprint to the USB controller, or chipset. In this manner, a common motherboard designs may be utilized for IHSs that support either high-speed or lower speed USB data transfers, where lower speed USB data transfers are supported economically through the use of a passive, low-cost component that is designed to interoperate with a motherboard USB retimer footprint that can also support high-speed USB data transfers through installation of a retimer.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for manufacturing an Information Handling System (IHS), the method comprising:
    selecting a motherboard for the IHS, wherein the motherboard comprises a USB retimer footprint, wherein the motherboard comprises traces that couple the retimer footprint to a USB connector of the motherboard, and wherein the motherboard further comprises traces that couple the retimer footprint to a USB controller coupled to the motherboard;
    determining a USB speed to be supported by the motherboard;
    when the motherboard is determined to support a first USB speed, installing a USB retimer in the retimer footprint of the motherboard, wherein the first USB speed is 10 Gbps; and
    when the motherboard is determined to support a second USB speed that is slower than the first USB speed, installing a passive bridge in the retimer footprint of the motherboard, wherein the second USB speed is 5 Gbps.

2. The method of claim 1, wherein the USB controller is a system-on-chip function of a processor of the IHS.

3. The method of claim 1, wherein the retimer footprint is located on the motherboard to support USB communications at or above the first USB speed.

4. The method of claim 3, wherein the location of the retimer footprint on the motherboard supports use of a single USB retimer for signals transmitted via the retimer footprint.

5. The method of claim 1, wherein the passive bridge does not utilize a clock signal.

6. The method of claim 1, wherein the passive bridge is comprised of a dielectric substrate.

7. The method of claim 1, wherein the motherboard is configured during manufacture for supporting the determined USB speed based on installation of the USB retimer or the passive bridge in the retimer footprint.

8. The method of claim 1, wherein the motherboard traces couple the retimer footprint to multiple USB connectors of the motherboard.

9. The IHS of claim 8, wherein the USB controller is a system-on-chip function of a processor of the IHS.

10. The IHS of claim 9, wherein the location of the first retimer footprint on the motherboard supports use of a single USB retimer for signals transmitted via the first retimer footprint.

11. The IHS of claim 8, wherein the first retimer footprint is located on the motherboard to support USB communications at or above the first USB speed.

12. The IHS of claim 8, wherein the passive bridge is comprised of a dielectric substrate and bonding conductors.

13. An Information Handling System (IHS) comprising:
    a plurality of USB connectors coupled to a motherboard;
    a USB controller coupled to the motherboard; and
    the motherboard comprising a plurality of USB retimer footprints, and further comprising traces that couple a first retimer footprint to a first USB connector of the plurality of USB connectors, and further comprising traces that couple the first retimer footprint to the USB controller, wherein a USB retimer is installed in the first retimer footprint of the motherboard, when the motherboard supports a first USB speed, wherein the first USB speed is 10 Gbps, and wherein a passive bridge is installed in the first retimer footprint of the motherboard, when the motherboard supports a second USB speed that is slower than the first USB speed, wherein the second USB speed is 5 Gbps.

14. A motherboard for use by an Information Handling System (IHS), the motherboard comprising:
- a plurality of USB connectors;
- a USB controller;
- traces that couple a USB retimer footprint to a first USB connector of the plurality of USB connectors;
- traces that couple the USB retimer footprint to the USB controller; and
- a USB retimer footprint, wherein a USB retimer is installed in the retimer footprint of the motherboard, when the motherboard supports a first USB speed, wherein the first USB speed is 10 Gbps, and wherein a passive bridge is installed in the retimer footprint of the motherboard, when the motherboard supports a second USB speed that is slower than the first USB speed, wherein the second USB speed is 5 Gbps.

15. The motherboard of claim 14, wherein the retimer footprint is located on the motherboard to support USB communications at or above the first USB speed.

16. The motherboard of claim 15, wherein the location of the retimer footprint on the motherboard supports use of a single USB retimer for signals transmitted via the retimer footprint.

17. The motherboard of claim 14, wherein the passive bridge is comprised of a dielectric substrate and does not utilize a clock signal.

* * * * *